United States Patent

McAfee

[11] Patent Number: 5,271,520
[45] Date of Patent: Dec. 21, 1993

[54] FISHING PAIL SYSTEM

[76] Inventor: E. John McAfee, 10219 Cana St., Spring Hill, Fla. 34608

[21] Appl. No.: 25,078

[22] Filed: Mar. 2, 1993

Related U.S. Application Data

[63] Continuation-in-part of Ser. No. 891,291, May 29, 1992, abandoned.

[51] Int. Cl.$^5$ .................................................. B65D 85/20
[52] U.S. Cl. .................................. 220/529; 220/554; 220/512; 206/499; 206/315.11; 206/373
[58] Field of Search ........... 206/499, 372, 373, 315.11, 206/443, 535; 220/529, 507, 512, 510, 23.83, 23.86, 503, 509, 554, 523, 524, 735, 23.4, 23.6; 43/54.1, 55, 56, 57.1; 211/74, 128

[56] References Cited

U.S. PATENT DOCUMENTS

| | | | |
|---|---|---|---|
| 1,716,868 | 6/1929 | Stephens | 211/74 |
| 2,740,546 | 4/1956 | Kowalski | 220/411 |
| 3,731,585 | 5/1973 | Deinberg et al. | 206/499 |
| 4,362,243 | 12/1982 | Deyesso et al. | 206/373 |
| 4,366,641 | 1/1983 | Price et al. | 43/54.1 |
| 4,901,846 | 2/1990 | Lehman | 206/501 |
| 5,057,282 | 10/1991 | Linder | 220/507 |
| 5,150,794 | 9/1992 | Rooks | 220/507 |

*Primary Examiner*—Allan N. Shoap
*Assistant Examiner*—S. Castellano
*Attorney, Agent, or Firm*—Dominik, Stein, Saccocio, Reese, Colitz & Van Der Wall

[57] ABSTRACT

Apparatus for use in association with fishing comprising, in combination a pail with an open upper end, a closed lower end, and side walls with a cross section; a storage member in a configuration with a support member for supporting the storage member when located outside of the pail, the storage member also having a plurality of separate compartments for receiving items for use in fishing; shoulders adhered to the interior of the side walls, each shoulder including a flat storage member supporting surface for removably supporting the storage member in the pail, the storage member-supporting surface being spaced from the lower end of the pail by a distance greater than the height of the storage member.

7 Claims, 4 Drawing Sheets

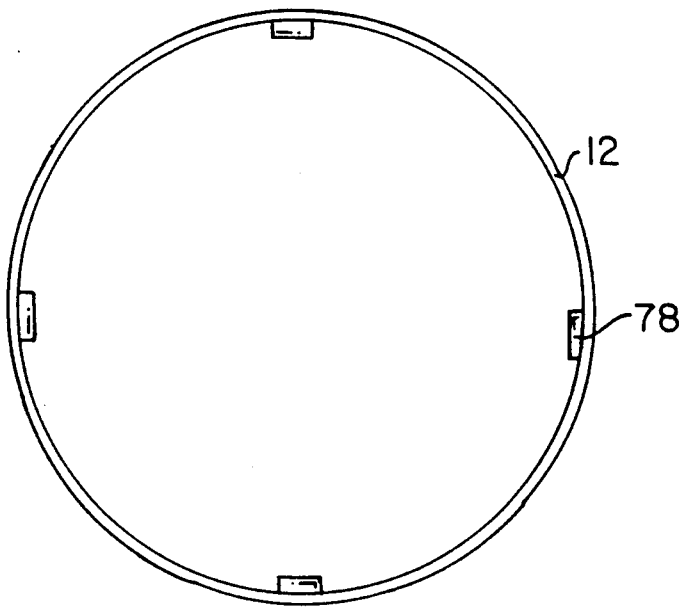
F I G. 1A
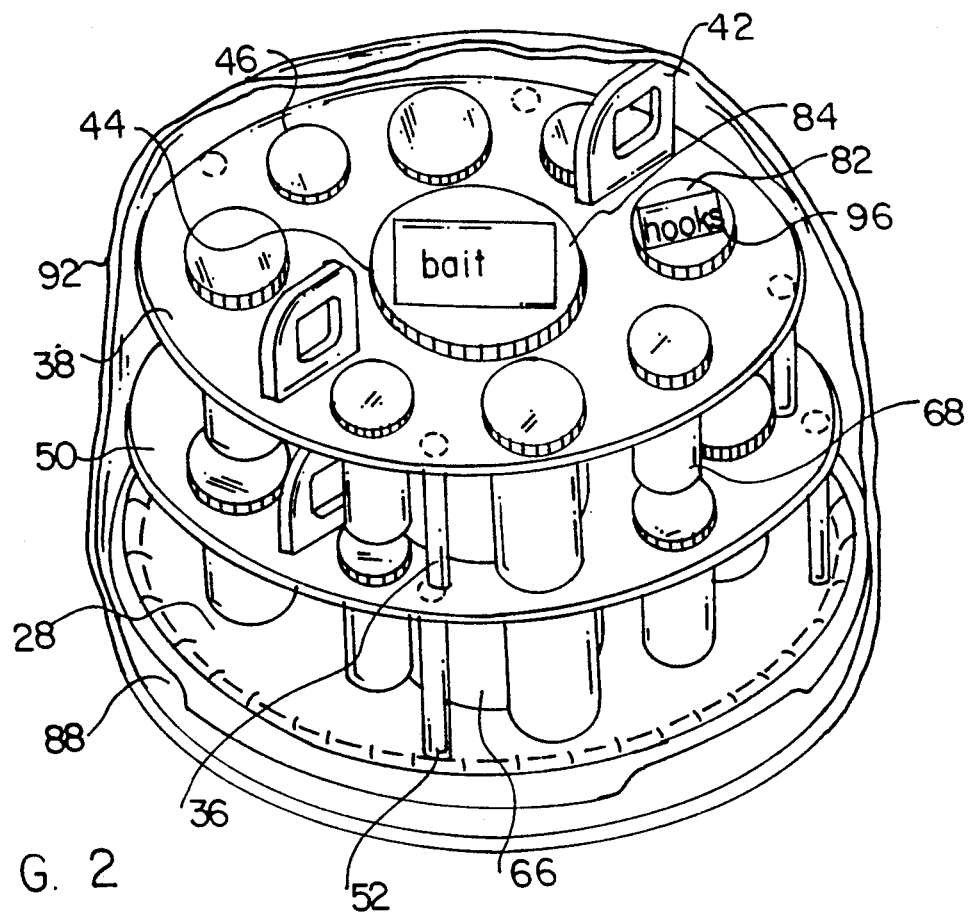
F I G. 2

FISHING PAIL SYSTEM

RELATED APPLICATION

This application is a continuation-in-part application of co-pending U.S. patent application Ser. No. 07/891,291, filed May 29, 1992 now abandoned..

BACKGROUND OF THE INVENTION

1. Field of the Invention

The present invention relates to a fishing pail system and, more particularly, to a fishing pail system comprising a lid positionable over trays positionable at spaced heights within a pail, the trays having holes for supporting containers for fishing equipment.

2. Description of the Background Art

Fishing is a sport that has enjoyed widespread popularity throughout the United States for quite some time. As with many other sports, technology has found its way into this once primitive field. Gone are the days when the repertoire of fishing equipment simply included a pole, a string and a worm. Today's fishing arsenal includes poles formed from exotic materials, super high-test lines and, of course, a vast array of high tech lures, hooks, bobbers, swivels, leaders and weights. With this explosion of fishing paraphernalia comes an increased demand for ways in which to conveniently and logically store large amounts of fishing hardware. One answer to the problem has come in the form of specialized tackle boxes. Tackle boxes, however, are often complex in construction and, therefore, expensive. Further, due to their specialized construction, they provide little use outside the realm of fishing.

The present invention overcomes the problems inherent with conventional tackle boxes by making use of a commonly-found household container. The present invention converts an ordinary pail into a system for useful fishing equipment organization.

Many attempts have been made to provide a fishing equipment organizer that overcomes the problems with conventional tackle boxes. By way of example, U.S. Pat. No. 3,751,845 to van Leeuwen discloses a transportable fishing bucket. The van Leeuwen patent comprises a conventional pail. The disclosure teaches a rotatably-mounted closure combined with antifriction means. The rotatably closure and antifriction structure requires a construction which is considerably complex. Thus, the van Leeuwen patent is costly and failure-prone due to its complexity. The apparatus of the present invention achieves its purposes with minimal moving parts, thereby providing a high degree of reliability.

U.S. Pat. No. 2,740,546 to Kowalski discloses a fishing bucket with removable compartments. The Kowalski patent discloses a specialized bucket and cover adapted to receive a single layer of specialized containers adapted to be received in the cover. However, there is no suggestion of multiple layers of trays for receiving readily available containers that are easily removed therefrom.

Journeyman Products, Ltd. markets a bucket storage system marketed as "Drop-In-The-Bucket. TM" The disclosure employs a number of open trays. The bottom tray rests upon the bottom of the bucket. Subsequent trays rest directly upon the tray immediately therebelow. This system, however, does not disclose removably cylindrical containers removably supported within its trays. Nor does it disclose means integral with a bucket for supporting trays independent of other trays.

Lastly, there are a wide variety of prior art patents which illustrate tray systems in cylindrical containers. By way of example, U.S. Pat. Nos. 855,565 to Greenhouse; 1,967,794 to Wagner; 1,716,868 to Stephens; 1,156,723 to Thomas, and 5,008,084 to Kelley disclose tray systems within cylindrical containers. None of these patents, however, are for use with fishing paraphernalia and none of them employ the specific tray system of the present invention.

It is, therefore, an object of the present invention to provide an improved apparatus for use in association with fishing comprising, in combination a pail with an open circular upper end, a closed circular lower end, and side walls with a circular cross section; a storage means in a circular configuration with support means for supporting the storage means when located outside of the pail, the storage means also having a plurality of separate compartments for receiving items for use in fishing; shoulders adhered to the interior of the side walls, each shoulder including a flat storage means supporting surface for removably supporting the storage means in the pail, the storage means-supporting surface being spaced from the lower end of the pail by a distance greater than the height of the storage means.

It is a further object of the present invention to retrofit a conventional pail with trays and a lid for constituting a fishing aid.

It is a further object of the present invention to store fishing components in containers positionable in trays, removably positioned in a pail.

It is a further object of the present invention to store, convey and utilize fishing gear in a convenient manner.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The present invention is defined by the appended claims with the specific embodiment shown in the attached drawings. For the purpose of summarizing the invention, the invention may be incorporated into apparatus for use in association with a pail of the type having an open circular upper end having a larger diameter, a closed circular lower end having a smaller diameter, and side walls with a circular cross section tapering evenly between the upper and lower ends, the pail also having a circumferential lip externally at the upper end, the improvement comprising a flat upper tray in a larger circular configuration, the upper tray having a plurality of downwardly extending legs for support when located outside of the pail, the upper tray also having a plurality of upwardly extending handles, the upper tray also having a plurality of apertures therethrough, with the apertures including a large aperture formed centrally in the tray and a plurality of smaller apertures formed peripherally in the tray, the smaller aperture being of varying sizes; a flat lower tray in a smaller circular configuration, the lower tray having a plurality of downwardly extending legs for support when located outside of the pail, the lower tray also having a plurality of upwardly extending handles, the lower tray also having a plurality of apertures therethrough, with the apertures including a large aperture formed centrally in the tray and a plurality of smaller apertures formed peripherally in the tray, the smaller aperture being of varying sizes; shoulders adhered to the interior of the side walls, each shoulder including a flat tray-supporting surface, one group of shoulders locatable a first predetermined shorter distance from the upper end of the pail for supporting the upper tray in the pail, and another group of shoulders locatable a second predetermined longer distance from the upper end of the pail for supporting the lower tray in the pail; the apertures adapted to removably receive and support a plurality of generally cylindrical containers for holding things related to fishing, the containers being of the type having enlarged caps or container flanges for being supported by the apertures, the containers being of a length less than the legs, the distance between the upper and lower trays within the pail being greater than the height of the caps plus the length of the legs, and a lid positionable over the upper edge of the pail, the lid having a plurality of downwardly extending fingers adapted to be removably received by the lip of the pail.

The invention may also be incorporated into apparatus for use in association with fishing comprising, in combination a pail with an open circular upper end having a larger diameter, a closed circular lower end having a smaller diameter, and side walls with a circular cross section tapering evenly between the upper and lower ends, the pail also having a circumferential lip externally at the upper end; a flat upper tray in a larger circular configuration, the upper tray having a plurality of downwardly extending legs for support when located outside of the pail, the upper tray also having a plurality of upwardly extending handles, the upper tray also having a plurality of apertures therethrough, with the apertures including a large aperture formed centrally in the tray and a plurality of smaller apertures formed peripherally in the tray, the smaller aperture being of varying sizes; a flat lower tray in a smaller circular configuration, the lower tray having a plurality of downwardly extending legs for support when located outside of the pail, the lower tray also having a plurality of upwardly extending handles, the lower tray also having a plurality of apertures therethrough, with the apertures including a large aperture formed centrally in the tray and a plurality of smaller apertures formed peripherally in the tray, the smaller aperture being of varying sizes; shoulders adhered to the interior of the side walls, each shoulder including a flat tray-supporting surface, one group of shoulders located a first predetermined shorter distance from the upper end of the pail for supporting the upper tray in the pail, and another group of shoulders located a second predetermined longer distance from the upper end of the pail for supporting the lower tray in the pail; a plurality of generally cylindrical containers removably positioned within the various apertures for holding things related to fishing, the containers having enlarged caps or container flanges for being supported by the apertures, the containers being of a length less than the legs, the distance between the upper and lower trays within the pail being greater than the height of the caps plus the length of the legs; a lid positionable over the upper edge of the pail, the lid having a plurality of downwardly extending fingers adapted to be removably received by the lip of the pail; and a handle pivotally coupled to the exterior surface of the side walls.

Lastly, the invention may be incorporated into apparatus for use in association with fishing comprising, in combination a pail with an open circular upper end, a closed circular lower end, and side walls with a circular cross section; a storage means in a circular configuration with support means for supporting the storage means when located outside of the pail, the storage means also having a plurality of separate compartments for receiving items for use in fishing; shoulders adhered to the interior of the side walls, each shoulder including a flat storage means supporting surface for removably supporting the storage means in the pail, the storage means-supporting surface being spaced from the lower end of the pail by a distance greater than the height of the storage means.

The storage means is a flat tray with apertures for receiving cylindrical containers. The support means are legs extending beneath the storage means. The legs extend a distance from the storage means greater than the containers.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1A is a plan view of the pail of FIG. 1.

FIG. 2 is a perspective illustration of a lid and trays packaged for sale to be used with a pail.

Similar reference characters refer to similar parts throughout the several views of the drawings.

DETAILED DESCRIPTION OF THE PREFERRED EMBODIMENT

Figure 1:
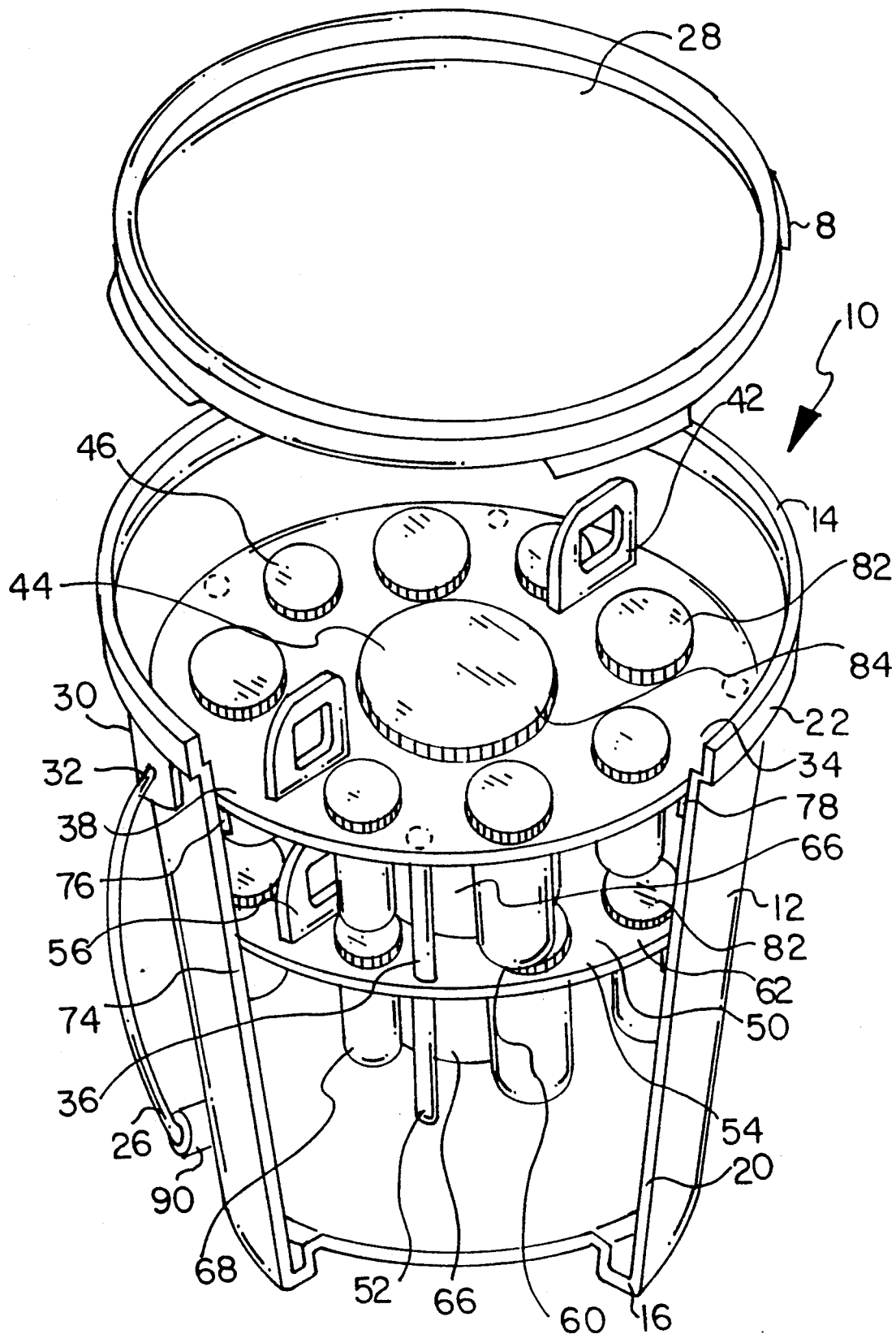
FIG. 1 is a perspective illustration of a fishing pail with lid, trays and containers constructed in accordance with the principles of the present invention.
Figure 3:
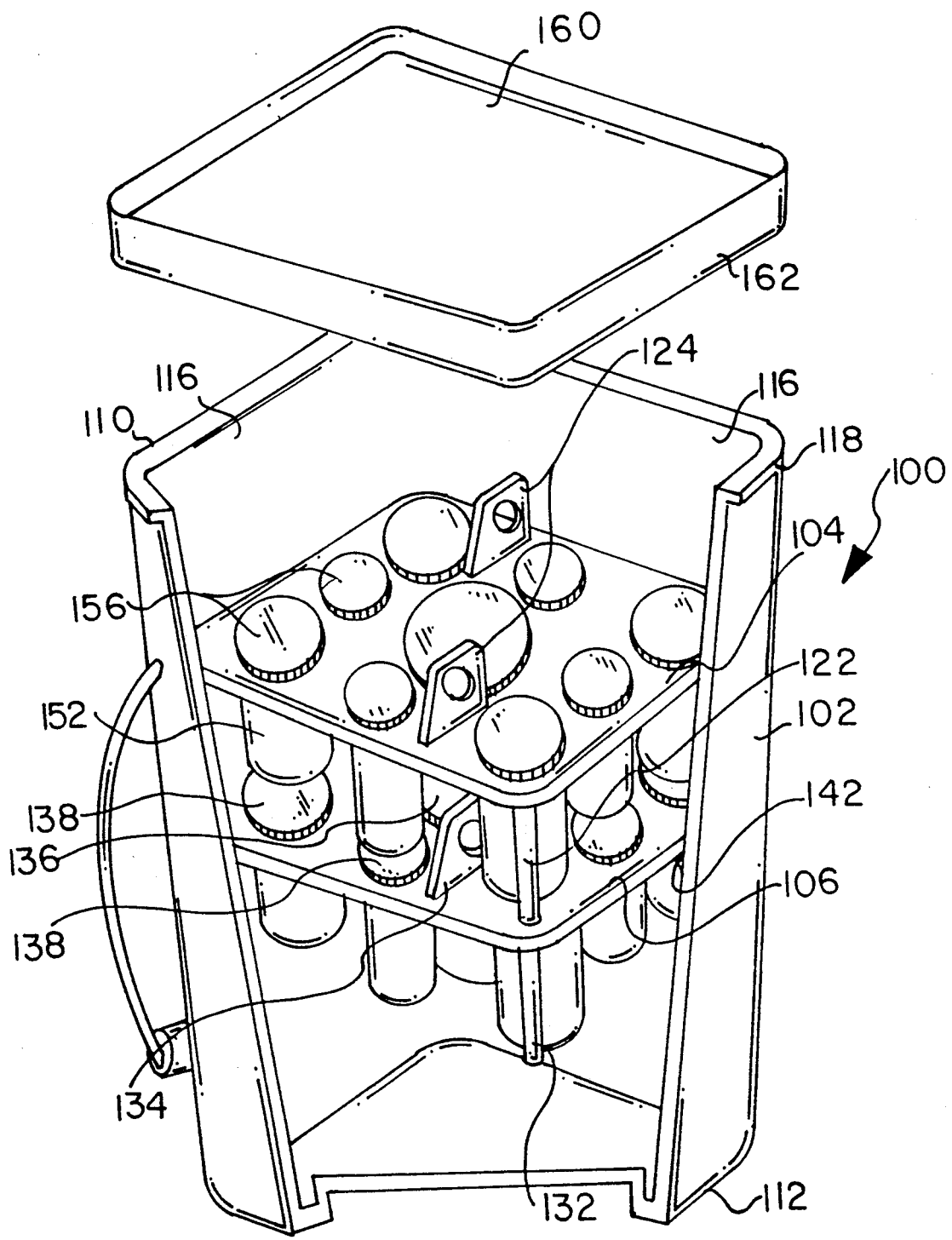
FIG. 3 is a perspective illustration of a fishing pail with lid, trays and containers constructed in accordance with an alternate embodiment of the invention.
Figure 4:
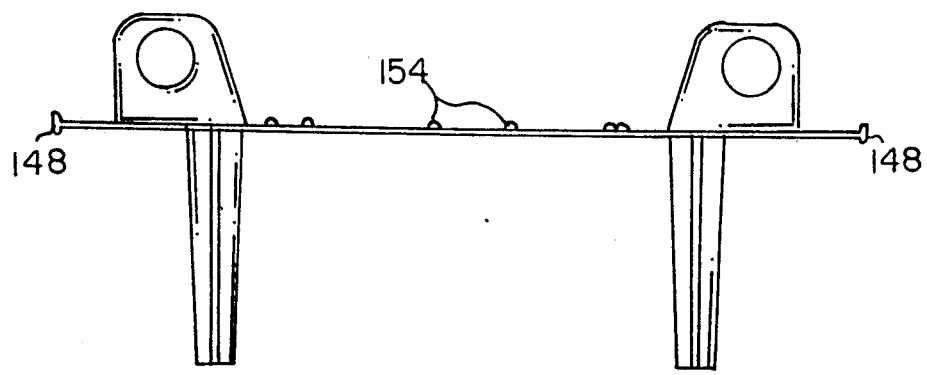
FIG. 4 is an elevational view of a tray of the FIG. 3 embodiment.
Figure 5:
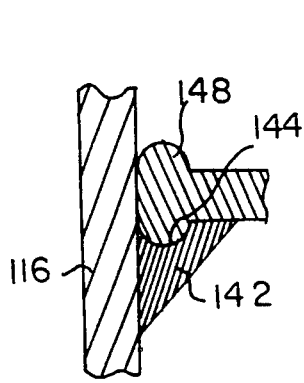
FIG. 5 is a sectional view illustrating the coupling between the tray and bucket of FIG. 3.
Figure 6:
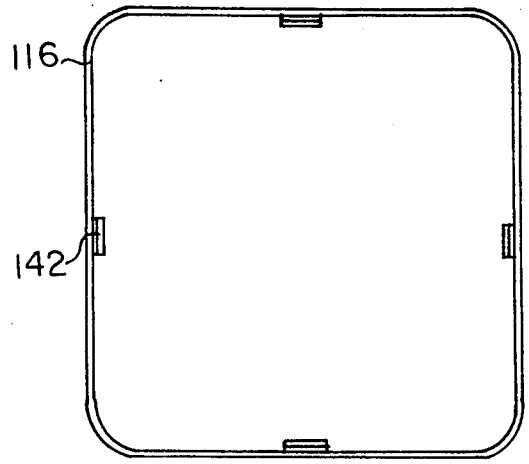
FIG. 6 is a plan view of the bucket of FIG. 3.
Figure 7:
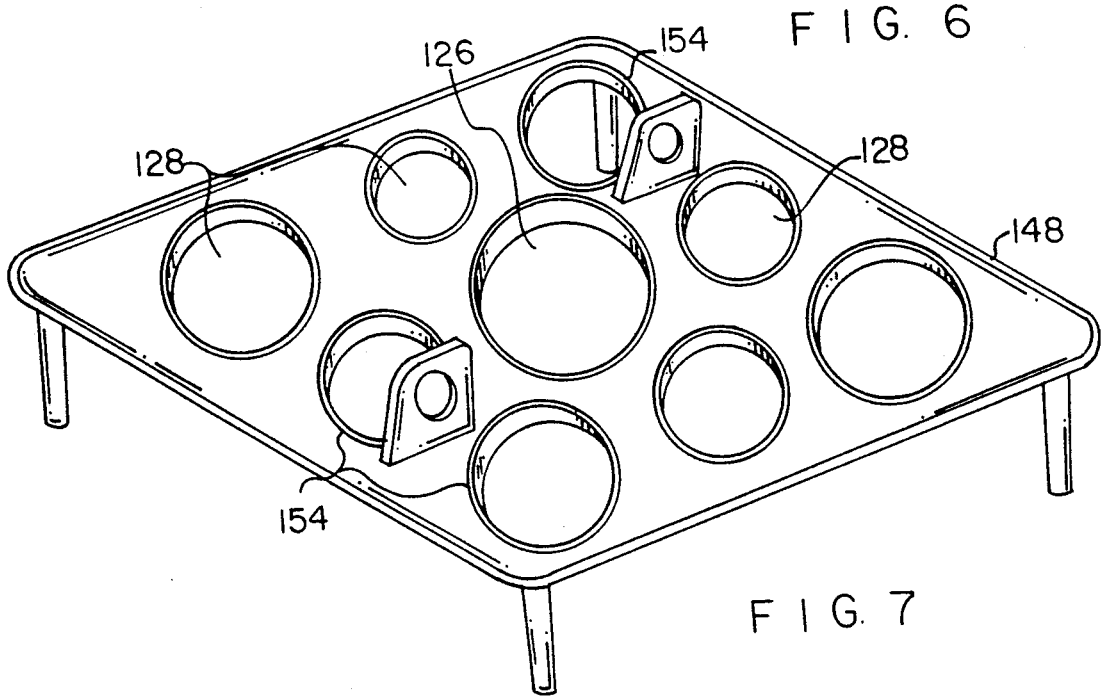
FIG. 7 is a perspective illustration of the tray of FIGS. 3 and 4.

Shown in FIG. 1 is a fishing pail system or assembly 10 of the preferred embodiment of the present invention. The system includes a pail 12. The pail has an open upper circular end 14 and a closed lower circular end 16. Further, diameter of the upper end is greater than that of the lower end. The side walls 20 of the pail taper evenly between the upper and lower ends. The pail further includes a circumferential lip 22. The lip is located externally at the upper end. Finally a handle 26 is pivotally connected to the side walls 20 of the pail 12.

The lip 22 at the upper end 14 is for strengthening purposes. The lip further provides a circumferential member for removably coupling the lid 28 and pail 12. Additional strengthening 30 is provided at an intermediate point of the side walls for receiving the free ends 32 of the handle 26. In the preferred embodiment, the pail is about 14½ inches in height. The inner diameter at the upper end is about 11¼ inches. The diameter at the lower end is about 10 inches. The pail is constructed of a conventional elastomeric material.

The pail assembly 10 includes a flat upper tray 34. The upper tray 16 is adapted to be placed within the pail 12. The upper tray 34 includes a number of downwardly extending legs 36. The legs 36 are spaced about the periphery 38 of the tray. The downwardly extending legs provide support to the upper tray when the tray is outside of the pail. Additionally, the upper tray includes two upwardly extending handles 42. The upwardly extending handles 42 facilitate the removal of the tray from the pail. The upper tray further includes a large aperture 44 formed within its center. Additionally, a plurality of various sized smaller apertures 46 are formed through its outer periphery 38.

The pail assembly 10 further includes a flat lower tray 50. The lower tray has a diameter smaller than that of the upper tray 34. The lower tray 50 includes a plurality of downwardly extending legs 52. The legs are spaced about periphery 54 of the tray. The tray further includes two upwardly extending handles 56. Furthermore, lower tray has a large aperture 60 formed within its center. The tray further comprises a plurality of various sized smaller apertures 62 formed through the outer periphery 54 of the tray 50.

In the preferred embodiment, the upper tray has a diameter of about 11 inches. The lower tray has a diameter of about 10⅝ inches. Except for the exterior diameter, both trays are of a similar construction. In the preferred embodiment, each tray is fabricated of a rigid elastomer of about ⅛ inch in thickness. The central apertures are preferably 2¾ inches in diameter for receiving a conventional polystyrene coffee cup or like container 66 for containing bait. The larger circumferential apertures are about 2 inches in diameter. The smaller is about 1½ inches in diameter. The apertures are sized to receive conventional containers 68 which are widely used for containing pills or other medication. The trays are of essentially the same construction, the same mold can be used for fabricating both trays. The only requirement would be the use of an insert member in the mold to reduce the diameter of the lower tray. Further, during fabrication, it is preferred that the legs and handles be integrally molded with the trays. The legs are about 3½ inches in length in the preferred embodiment. The handles extend upwardly about 1½ inches so that they may be placed in the pail without interference with the lower flat surface of the pail, the upper lid or the containers placed within the apertures of a tray thereabove.

Shoulders 74 are adhered to the interior of the side walls of the pail at two different locations. A first group of shoulders is for supporting the upper tray. A second group of shoulders is for the support of the lower tray. The first group of shoulders is located at a first given distance from the upper end of the pail, about 3 inches. The second group of shoulders is located a second longer distance from the upper end of the pail, about 5 inches. Each of the shoulders includes a flat tray supporting surface 76. The surface is adapted to support a segment of the flat tray. The shoulders further include an interior adhesive surface 78 allowing a purchaser to place the shoulders at an appropriate location. The location of each shoulder is determined by measuring with a ruler or for comparing location with preformed markings on an instruction sheet. Four such shoulders are preferably employed at equally-spaced locations around the periphery of the pail.

A plurality of generally cylindrical containers 68 are removably positioned within the various apertures 46 and 62 of the upper and lower trays. The containers are for holding objects related to fishing. The containers include enlarged caps 82. The caps are of sufficient size or have container flanges to prevent the containers from passing through their respective apertures. Safety childproof couplings are preferably utilized. The spacing of the first group of shoulders, and thus the spacing of the upper tray, is such that the containers and legs of the upper tray do not come into contact with the lower tray. Similarly, the second group of shoulders is positioned such that the containers and legs of the lower tray do not contact the bottom portion of the pail.

In the preferred embodiment, the larger containers 66 are about 3½ inches in height with a ⅜ inch high cap 84. With a cap or container flange on the container resting on the upper surface of the aperture of any tray, the containers will extend downwardly a distance less than the height of the legs. In this manner, when the trays are taken from the pail and placed on the ground, boat, pier or other fishing surfaces, the bottom of the legs will support the trays and their containers without interfering with the positioning of the containers within the trays. The smaller containers 68 are about 1¼ inches in diameter and about 2½ inches in height with the caps 82 being about ¼ inches in height. Smaller containers of varying sizes may be utilized with their apertures matched to their diameters. The bait container is preferably a tapered plastic coffee cup having a height of about 3½ inches. The tapering of the side walls of the cup effect the proper positioning within the tray. In the alternative, any type of large conventional container may be utilized.

The pail assembly 10 additionally includes a lid 28. The lid is positionable over the upper end 14 of the pail 12. The lid includes a plurality of downwardly extending fingers 88. The fingers 88 are contoured so as to be adapted to be removable received by the circumferentially extending lip of the pail.

In order to conveniently move the pail assembly a pivotal handle provided. The handle 26 has a central extent 90 for grasping. The handle further includes free ends 32 pivotally coupled to the exterior surface of the side walls at the strengthened areas.

In use, the cylindrical containers of the pail assembly can store various sized fishing devices such as lures, hooks, weights etc. The cylindrical containers are such that they can be removed separately, or alternatively, one of the trays, with all of its containers, can be removed as a unit. Furthermore, the downwardly extending legs of the trays are such that each of the trays can stand alone outside of the pail. Thus, with both of the trays removed, the pail can be used in its conventional manner.

Inasmuch as the pail and containers are staple items of commerce and readily available in most households, it is preferred that the apparatus of the present invention be marketed by selling merely the upper tray, the lower tray and the lids packaged together by shrink-wrap transparent plastic 92. Note FIG. 2. The pail need not be sold therewith since most households have extra pails of this conventional design which can be adapted for ready use. Further, although the FIG. 2 shows the product ready for sale and illustrates containers with caps, the trays and lids can be sold without the containers. Selling of the assembly with containers and caps is simply a further convenience to the user.

Also sold with the assembly of FIG. 2 is an instruction sheet including information for the purchaser as to the method of use of the assembly. Such instruction sheet is provided with preformed marks to assist in the measuring of the pail for positioning the shoulders. Alternately, the instruction sheet includes a section with the shoulders adhesively adhered to the sheet for removal and placement on the interior surface of the pail. A further alternate embodiment includes small strips of paper or plastic with preprinted labels of other indicia markings. Such preprinted labels 96 are peeled from the sheet and placed on the upper surface of the caps to indicate the type of fishing equipment within each individual container. By way of example, the preprinted labels are directed to "weights," "hooks," "floats," "snaps," "bobbers," "leaders," etc. A plurality of each of such labels are included along with tags upon which the user could write other information indicative of the contents of the specific container.

An alternate embodiment of the invention is the system 100 illustrated in FIGS. 3 through 7. The principal difference in the alternate embodiment is in the shape of the pail 102 and trays 104, 106, which are rectangular, preferably square, rather than circular or round as in the primary embodiment. The pail 102 is of the type having an open rectangular upper end 110 with a first size and also including a closed rectangular lower end 112 having a size smaller than the first size. Side walls 116 have a trapedozial shape tampering evenly between the upper and lower ends. The pail also has a circumferential lip 118 externally at the upper end.

Used in association with the pail 102 is a flat upper tray 104 in a first rectangular configuration. The upper tray has a plurality of downwardly extending legs 122 for support when located outside of the pail. The upper tray 104 also has a plurality of upwardly extending handles 124 and a plurality of apertures 126, 128 extending through the tray. The apertures include a large first aperture 126 formed centrally in the tray and plurality of second apertures 128, smaller than the first aperture formed around the periphery of the tray. The second apertures are preferably of varying sizes. Additionally, a lip 154 is formed about the periphery of each aperture.

A flat lower tray 106 is also provided. Such lower tray is also in a second rectangular configuration smaller than the first rectangular configuration. The lower tray also has a plurality of downwardly extending legs 132 for support when located outside of the pail.

The lower tray 106 also has a plurality of upwardly extending handles 134 and a plurality of apertures 136 and 138 therethrough. The apertures includes a first aperture 136 formed centrally in the tray and a plurality of second apertures 138 smaller than the first apertures formed peripherally in the tray. The second apertures are of varying sizes. In order to create a more secure coupling between pail and trays in the alternate embodiment, each tray is formed with an embodiment 148 around its periphery. When received in correspondingly shaped recesses 144 in the supporting shoulders 142, this provides added stability and also functions to hold the sides of the pail inwardly when filled with water which tends to lend the sides of the pail outwardly.

Shoulders 142 are provided to adhere, as by adhesive, to the interior of the side walls 116. Each shoulder 142 includes a tray-supporting surface with a downwardly extending recess 144 for receiving the enlargement 148 around the periphery of the trays. One group of shoulders is located a first predetermined distance from the upper end of the pail for supporting the upper tray 104 in the pail. Another group of shoulders is located a second predetermined distance longer than the first distance from the upper end of the pail for supporting the lower tray 106 in the pail.

Apertures 126, 128, 136 formed in the trays are adapted to removably receive and support a plurality of generally cylindrical containers. The containers include caps for holding things related to fishing. The containers are of the type having enlargements for being supported by the lips 154 at the periphery of apertures 126, 128, 136, 138. The containers are of a length less than the legs and the distance between the upper and lower trays. The containers of the lower trays within the pail are greater than the height of the caps 156 plus the length of the legs.

Lastly, a lid 160 is positionable over the upper edge of the pail. The lid has a plurality of downwardly extending fingers 162 adapted to be removably received by the lip of the pail to close the pail.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of structures and the combination and arrangement of parts may be resorted to without departing from the spirit and scope of the invention.

Now that the invention has been described,
What is claimed is:

1. For use in association with a pail of the type having an open circular upper end having a first diameter, a closed circular lower end having a diameter smaller than the first diameter, and side walls with a circular cross section tapering evenly between the upper and lower ends, the pail also having a circumferential lip externally at the upper end, the improvement comprising:

a flat upper tray in a first circular configuration, the upper tray having a plurality of downwardly extending legs for support when located outside of the pail, the upper tray also having a plurality of upwardly extending handles, the upper tray also having a plurality of apertures therethrough, with the apertures including a first aperture formed centrally in the tray and a plurality of second apertures smaller than the first aperture formed peripherally in the tray, the second apertures being of varying sizes;

a flat lower tray in a second circular configuration smaller than the first circular configuration, the lower tray having a plurality of downwardly extending legs for support when located outside of the pail, the lower tray also having a plurality of upwardly extending handles, the lower tray also having a plurality of apertures therethrough, with the apertures including a first aperture formed centrally in the tray and a plurality of second apertures smaller than the first apertures formed peripherally in the tray, the second apertures being of varying sizes;

shoulders adhered to the interior of the side walls, each shoulder including a flat tray-supporting surface, one group of shoulders locatable a first predetermined distance from the upper end of the pail for supporting the upper tray in the pail, and another group of shoulders locatable a second predetermined distance longer than the first distance from the upper end of the pail for supporting the lower tray in the pail;

the apertures adapted to removably receive and support a plurality of generally cylindrical containers with caps for holding things related to fishing, the containers being of the type having enlarged means for being supported by the apertures, the containers being of a length less than the legs, the distance between the upper and lower trays within the pail being greater than the height of the caps plus the length of the legs, and a lid positionable over the upper edge of the pail, the lid having a plurality of downwardly extending means adapted to be removably received by the lip of the pail.

2. Apparatus for use in association with fishing comprising, in combination:

a pail with an open circular upper end having a first diameter, a closed circular lower end having a second diameter smaller than the first diameter, and side walls with a circular cross section tapering evenly between the upper and lower ends, the pail also having a circumferential lip externally at the upper end;

a flat upper tray in a first circular configuration, the upper tray having a plurality of downwardly extending legs for support when located outside of the pail, the upper tray also having a plurality of upwardly extending handles, the upper tray also having a plurality of apertures therethrough, with the apertures including a first aperture formed centrally in the tray and a plurality of second apertures smaller than the first apertures formed peripherally in the tray, the second apertures being of varying sizes;

a flat lower tray in a second circular configuration smaller than the first configuration, the lower tray having a plurality of downwardly extending legs for support when located outside of the pail, the lower tray also having a plurality of upwardly extending handles, the lower tray also having a plurality of apertures therethrough, with the apertures including a first aperture formed centrally in the tray and a plurality of second apertures smaller than the first aperture formed peripherally in the tray, the second apertures being of varying sizes;

shoulders adhered to the interior of the side walls, each shoulder including a flat tray-supporting surface, one group of shoulders located a first predetermined distance from the upper end of the pail for supporting the upper tray in the pail, and another group of shoulders located a second predetermined distance longer than the first distance from the upper end of the pail for supporting the lower tray in the pail;

a plurality of generally cylindrical containers with caps removably positioned within the various apertures for holding things related to fishing, the containers having enlarged means for being supported by the apertures, the containers being of a length less than the legs, the distance between the upper and lower trays within the pail being greater than the height of the caps plus the length of the legs;

a lid positionable over the upper edge of the pail, the lid having a plurality of downwardly extending fingers adapted to be removably received by the lip of the pail; and a handle pivotally coupled to the exterior surface of the side walls.

3. Apparatus for use in association with fishing comprising, in combination:

a pail with an open circular upper end, a closed circular lower end, and side walls with a circular cross section;

means for storing in a circular configuration and having downwardly extending legs located radially interiorly of the periphery of the means for storing, the means for storing also having a plurality of separate compartments for receiving items for use in fishing, the means for storing having a lower peripheral surface extending radially outwardly of the legs;

a plurality of shoulders adhered to the interior of the side walls, the shoulders each including a flat upper surface for removably supporting the lower peripheral surface of the means for storing in the pail, the shoulders being spaced from the lower end of the pail by a distance greater than the height of the means for storing, the legs being of a length whereby the means for storing is solely supported by the legs when outside of the pail, but is solely supported by the shoulders when inside the pail.

4. The apparatus as set forth in Claim 3 wherein the means for storing is a flat tray with apertures for receiving and supporting cylindrical containers of a length less than the length of the legs.

5. The apparatus as set forth in claim 3 wherein the periphery of the means for storage is circular.

6. The apparatus as set forth in claim 3 wherein the periphery of the means for storage is rectangular.

7. The apparatus as set forth in claim 6 wherein the periphery has an enlarged cross section for being received in correspondingly shaped recesses in the shoulders.

* * * * *